United States Patent [19]

Petermann et al.

[11] Patent Number: 4,637,369

[45] Date of Patent: Jan. 20, 1987

[54] APPARATUS FOR SPANNING A CENTER-OPENING SAW BLADE

[75] Inventors: Harald Petermann; Peter Bauer, both of Nuremberg, Fed. Rep. of Germany

[73] Assignee: GMN Georg Muller Nurnberg GmbH, Fed. Rep. of Germany

[21] Appl. No.: 801,099

[22] Filed: Nov. 22, 1985

[30] Foreign Application Priority Data

Nov. 23, 1984 [DE] Fed. Rep. of Germany ....... 3442730

[51] Int. Cl.$^4$ .............................................. B28D 1/04
[52] U.S. Cl. ...................................... 125/15; 51/73 R
[58] Field of Search ........................... 125/15; 51/73 R

[56] References Cited

U.S. PATENT DOCUMENTS

| 3,955,551 | 5/1976 | Tang ...................................... 125/15 |
| 4,151,826 | 5/1979 | Otte ................................... 51/73 R X |
| 4,498,449 | 2/1985 | Kachajian ............................. 125/15 |

FOREIGN PATENT DOCUMENTS

| 2841653 | 5/1979 | Fed. Rep. of Germany ........ 125/15 |
| 048060 | 11/1976 | Japan ...................................... 125/15 |
| 156382 | 11/1977 | Japan ...................................... 125/15 |
| 1162912 | 9/1969 | United Kingdom ................... 125/15 |

Primary Examiner—Harold D. Whitehead
Attorney, Agent, or Firm—Steinberg and Raskin

[57] ABSTRACT

A center-opening saw blade having an inner sawing edge is spanned or tensioned to provide an accurate, high quality cut by apparatus including inner and outer clamping collars between which an outer peripheral edge region of the saw blade is clamped, a spanner ring having an inner edge and an outer centering heel, the clamping collars being tightly affixed to the spanner ring with the clamping rings positioned in the centering heel with the inner edge of the spanner ring engaging an inner region of the saw blade to impart an initial stress thereto. A form ring is axially slidably mounted within the clamping collars and is slidable to engage an intermediate portion of the saw blade between the outer peripheral edge region clamped between the clamping collars and the inner region engaged by the inner edge of the spanner ring to impart a fine adjustment stress to the saw blade.

6 Claims, 2 Drawing Figures

APPARATUS FOR SPANNING A CENTER-OPENING SAW BLADE

BACKGROUND OF THE INVENTION

This invention relates generally to apparatus for use in material cutting operations and, more particularly, to apparatus for use with center-opening saw blades having an inner sawing edge for improving the accuracy and quality of the saw cut.

Center-opening saw blades are used in the cutting of hard, brittle materials of the type used in the manufacture of electrical components, such, for example, as silicon, germanium, quartz, sapphire, garnet and the like. Such center-opening saw blades are formed of thin, high-strength sheet metal and have an inner circular edge provided with a fine coating of natural diamond embedded in a galvanized bonding material. The outer diameter of the saw blade is obtained using an appropriate ring. In manufacture, the saw blade is stretched on a drum kiln to provide a high modulus for the saw blade which resists lateral forces.

The width or span of the saw blade is of great importance to the accuracy and quality of the cut obtained by the saw blade. The out-of-roundness error of the center opening about which the cutting edge is provided must be maintained at a minimum. It is also important to keep the sizes of the clamping collars and spanning edge rings which are used in the spanning or tensioning of the saw blade to a minimum. This is difficult to achieve, however, in saw blades having large diameters, such as about 21 inches or larger.

Apparatus for spanning or applying tension to centeropening saw blades having inner cutting edges are known. In this connection, reference is made to U.S. Pat. No. 3,955,551 and to German patent application No. DE 28 41 653. In particular, apparatus is disclosed in No. DE 28 41 653 wherein the spanning or tensioning of the blade is not produced through the use of a spanning edge. Rather, the saw blade is stretched by the provision, between a ring groove within the clamping collar and a correspondingly profiled spanning ring, of means whose position is axially adjustable through a large number of set screws for engaging a region of the saw blade close to its outer edge at the ring groove. When it is desired to apply a greater tension to the saw blade, such as where larger diameter saw blades are used, it is necessary that the blades project deeply into the ring groove to provide sufficient strength.

A highly accurate and true circular track for the inner cutter edge of the saw blade is achieved by spanning the saw blade. Deviations in the roundness of the center opening in the saw blade are obtained in the case where the radius of the center-opening is too small by stretching the saw blade outwardly and through a partial axial bending of the saw blade by means of the spanning ring provided at the groove of the restraining collar. Depending upon the degree of true roundness of the saw blade opening and the heterogeneity of the saw blade material, the spanning ring will deform axially to a greater or lesser extent and will also obtain a slanted or oblique position with respect to the axis of rotation of the saw blade, thereby affecting the alignment of the machine to the detriment of the quality of the cut obtained. Such conventional techniques are also disadvantageous in that it is not possible to disassemble the saw blade to rotate the same outside of the machine in order to reduce set-up time.

SUMMARY OF THE INVENTION

Accordingly, it is an object of the present invention to provide new and improved apparatus for spanning or tensioning center-opening saw blades and, in particular, saw blades having large diameters of about 21 inches or more.

Another object of the present invention is to provide new and improved apparatus for tensioning or spanning center-opening saw blades with minimum inefficiency with planar and out-of-round errors being minimized while reducing preparation time on the center-opening saw machine.

Briefly, in accordance with the present invention, these and other objects are attained by providing apparatus for tensioning or spanning a center-opening saw blade in a three-step procedure including saw blade changing, spanning, and centering.

In accordance with the invention, the saw blade is initially tightly clamped between two clamping collars outside of the machine. Secondly, the assembled unit comprising the saw blade and clamping collars is mounted on a receiving flange of the saw axle or spindle. Thus, the pair of clamping collars and the saw blade fixed between them is tightly affixed, such as by screwing the same in an axial direction on the centering flange, whereupon the center-opening saw blade is pulled and stretched by tightening it against the receiving flange of the saw spindle. Thirdly, a fine adjustment of the previously tightened center-opening saw blade is obtained by a form ring which is axially slidably guided along the inner diameter of one of the clamping collars, supported outwardly and axially over a threaded rim.

An important advantage of the spanning aparatus in accordance with the invention is that all of the mounting operations take place outside the machine and that all of the heavy components of the apparatus which are spaced a large radial distance from the center of rotation extend in a direction perpendicular to the axis of rotation and therefore do not detract from the alignment of the machine. Any deformation of the saw blade due to the spanning apparatus is essentially limited to a specified edge curvature.

In accordance with one feature of the invention, one of the clamping collars is designed to promote an efficient flow of debris and cooling liquid onto the saw head.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENT

Figure 1:
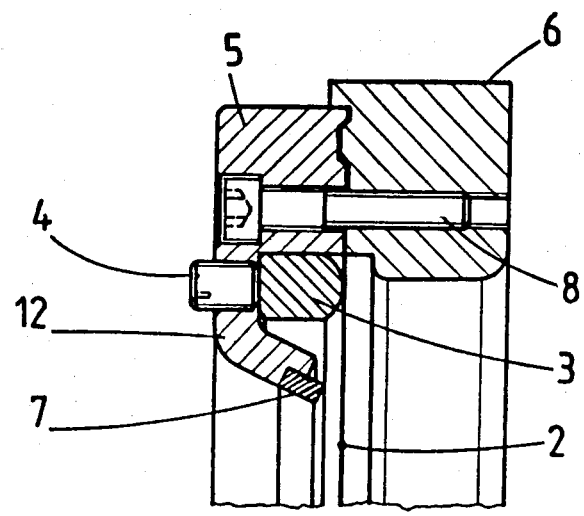
FIG. 1 is a partial cross-sectional view of a pair of clamping collars between which a center-opening saw blade is clamped, disassembled from the machine.

Referring now to the drawings wherein like reference characters designate identical or corresponding parts throughout the several views, the apparatus of the invention will be described in conjunction with a description of its use.

In a first step which is accomplished outside of the saw machine, a center-opening saw blade 2 is clamped at its outer peripheral edge region between outer and inner clamping collars 5 and 6 by means of screws 8. Thus, the outer and inner clamping collars 5 and 6 have clamping surfaces between which the saw blade is clamped to form a saw blade-clamping collar assembly which is adapted to be mounted over a spindle flange of the saw machine.

The outer clamping collar 5 is provided with a substantially conical inner portion 12 which terminates at a bearing member 7. A form ring 3 is axially slidably mounted within the clamping collar 5 so as to be axially guided by the inner surface of collar 5. A plurality of set screws 4 are provided around the outer clamping collar 5 and through suitable adjustment of set screws 4, the form ring 3 can be axially moved to engage a portion of the saw blade. As seen in FIG. 1, the set screws 4 are adjusted to be in their outermost positions so that form ring 3 does not engage the saw blade 2.

In a second operational step, the saw blade-clamping collar assembly of FIG. 1 is tightly affixed to a spanner ring 1 adapted to be mounted onto the spindle flange of the saw machine. The spanner ring 1 has an inner circular edge 10 and a centering heel 11 extending around a peripheral region thereof. The centering heel 11 comprises a shoulder that opens both axially and radially outwardly and when the saw-blade clamping collar assembly is affixed to spanner ring 1, the inner clamping collar 6 is tightly affixed on the centering heel shoulders. The saw-blade clamping collar assembly is affixed to the spanner ring 1 by means of screws 9.

When the saw blade-clamping collar assembly is affixed to the spanner ring 1, an inner region of the saw blade engages the inner edge 10 of the spanner ring 1 so that the saw blade 2 is diagonally drawn or stretched over the edge 10 to impart an initial stress to the saw blade.

In a third operational step, a fine adjustment stress is imparted to the saw blade 2 through the adjustment of set screws 4 to engage the outer surface of the form ring 3 to axially slide the latter into engagement with an intermediate portion of the saw blade between the outer peripheral edge region clamped between the clamping collars 5 and 6 and the inner region which engages the inner edge 10 of spanner ring 1. In this manner, errors or deviations in roundness of the center opening of the saw blade, undulations and rolling tolerances in the saw blade can be corrected.

Figure 2:
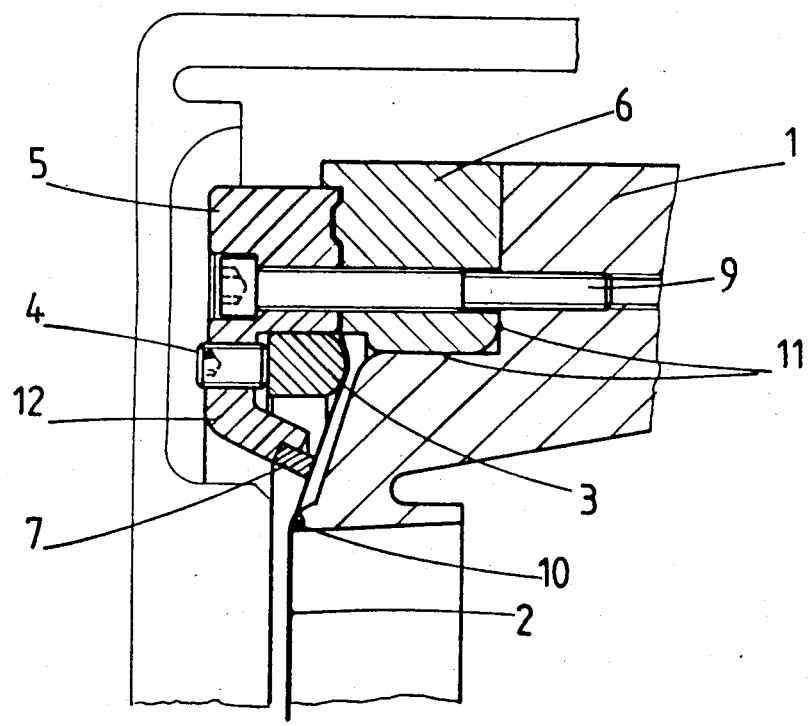
FIG. 2 is a partial cross-sectional view of apparatus in accordance with the invention coupled to the saw machine.

The conically shaped inner portion 12 of the outer clamping collar 5 preferably engages the saw blade 2 at bearing member 7 as seen in FIG. 2 to divert cooling water and cutting debris around the saw in an advantageous manner.

Obviously, numerous modications and variations of the present invention are possible in the light of the above teachings. It is therefore to be understood that within the scope of the claims appended hereto, the invention may be practiced otherewise than as specifically disclosed herein.

What is claimed is:

1. Apparatus for tensioning a center-opening saw blade having an inner sawing edge, the saw blade to be mounted on a spindle flange of a sawing machine, comprising:

two clamping collars having respective clamping surfaces;

means for releasably connecting said clamping collars to one another at a location remote from the sawing machine so as to clamp an outer peripheral edge region of the saw blade between said clamping surfaces and for said collars and said saw blade together to form an assembly adapted to be mounted over the spindle flange;

a tensioning ring adapted to be mounted onto the spindle flange and having an inner circular edge and an outer centering heel extending around a peripheral region thereof;

means for tightly affixing said assembly to said tensioning ring with at least one of said clamping collars being positioned in said centering heel and an inner region of said saw blade engaging said inner edge of said tensioning ring to impart an initial stress to said saw blade;

a form ring axially slidably mounted within said assembly; and means for axially sliding said form ring relative to said assembly to engage an intermediate portion of the saw blade which is situated between the outer peripheral edge region and said inner region of said saw blade to impart a fine adjustment stress to the saw blade.

2. The apparatus of claim 1, wherein said centering heel of said tensioning ring comprises a shoulder opening axially and radially outwardly of said tensioning ring; and wherein said one clamping collar is tightly affixed on said centering heel shoulder.

3. The apparatus of claim 1, wherein said form ring is situated within the other of said clamping collars.

4. The apparatus of claim 1, wherein said means for sliding said form ring comprises set screws mounted in the other of said clamping collars.

5. The apparatus of claim 1, wherein the other of said clamping collars includes a substantially conical inner portion extending within said form ring and adapted to deflect coolant and cutting debris during a cutting operation.

6. A method of tensioning a center-opening saw blade having an inner sawing edge, the saw blade to be mounted on a spindle flange, comprising the steps of forming an assembly including the saw blade, two clamping collars which are releasably connected to one another in such a manner that respective clamping surfaces of these collars clamp an outer peripheral edge region of the saw blade between themselves, and a form ring axially slidably mounted within one of the collars;

tightly affixing the assembly to a tensioning ring which is adapted to be mounted onto the spindle flange and has an inner circular edge and an outer centering heel extending around a peripheral region thereof, in such a manner that at least a first of the clamping rings is positioned in the centering heel and that an inner region of the saw blade engages the inner edge of the tensioning ring to impart an initial stress to the saw blade; and axially sliding the form ring relative to the one clamping ring to engage an intermediate portion of the saw blade which is situated between the outer peripheral edge region and the inner region thereof to impart a fine adjustment stress to the saw blade.

* * * * *